United States Patent [19]
Zerger

[11] Patent Number: 6,082,270
[45] Date of Patent: Jul. 4, 2000

[54] TIRE MOUNTED WORK TRAY

[76] Inventor: Lawrence M. Zerger, 1903 7th St. S., Nampa, Id. 83651

[21] Appl. No.: 09/321,153

[22] Filed: May 27, 1999

[51] Int. Cl.$^7$ ..................................................... A47B 23/00
[52] U.S. Cl. ............................................... 108/44; 108/42
[58] Field of Search ................................. 108/42, 43, 44, 108/45, 46, 47; 248/231.31, 231.41, 231.51

[56] References Cited

U.S. PATENT DOCUMENTS

| | | | |
|---|---|---|---|
| 2,584,955 | 2/1952 | Williams. | |
| 2,797,973 | 7/1957 | Culpepper | 108/43 X |
| 2,825,611 | 3/1958 | Aynesworth | 108/45 |
| 2,844,429 | 7/1958 | Frey | 108/43 |
| 3,939,986 | 2/1976 | Pierro | 108/44 X |
| 5,479,866 | 1/1996 | Rae | 108/44 |
| 5,673,888 | 10/1997 | Garguilo | 248/231.41 X |
| 5,909,922 | 6/1999 | Dugas | 108/43 X |

*Primary Examiner*—Jose V. Chen

[57] ABSTRACT

A tire mounted work tray for providing convenient and easy access to tools while working on vehicles includes an elongated support base with a track formed therein, a tool tray secured to an upper surface of the support base, and an adjustable clamping mechanism secured to the support base for clamping the device to a vehicle tire or other convenient support structure.

6 Claims, 4 Drawing Sheets

TIRE MOUNTED WORK TRAY

BACKGROUND OF THE INVENTION

1. Field of the Invention

The present invention relates to tool trays and supports for tool trays and more particularly pertains to a new tire mounted work tray for providing convenient and easy access to tools while working on vehicles.

2. Description of the Prior Art

The use of tool trays and supports for tool trays is known in the prior art. More specifically, tool trays and supports for tool trays heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,341,304; U.S. Pat. No. 4,309,009; U.S. Pat. No. 307,967; U.S. Pat. No. 4,506,855; U.S. Pat. No. 4,136,904; and U.S. Pat. No. 4,169,532.

While these devices fulfill their respective, particular objectives and requirements, the aforementioned patents do not disclose a new tire mounted work tray. The inventive device includes an elongated support base with a track formed therein, a tool tray secured to an upper surface of the support base, and an adjustable clamping mechanism secured to the support base for clamping the device to a vehicle tire or other convenient support structure.

In these respects, the tire mounted work tray according to the present invention substantially departs from the conventional concepts and designs of the prior art, and in so doing provides an apparatus primarily developed for the purpose of providing convenient and easy access to tools while working on vehicles.

SUMMARY OF THE INVENTION

In view of the foregoing disadvantages inherent in the known types of tool trays and supports for tool trays now present in the prior art, the present invention provides a new tire mounted work tray construction wherein the same can be utilized for providing convenient and easy access to tools while working on vehicles.

The general purpose of the present invention, which will be described subsequently in greater detail, is to provide a new tire mounted work tray apparatus and method which has many of the advantages of the tool trays and supports for tool trays mentioned heretofore and many novel features that result in a new tire mounted work tray which is not anticipated, rendered obvious, suggested, or even implied by any of the prior art tool trays and supports for tool trays, either alone or in any combination thereof.

To attain this, the present invention generally comprises an elongated support base with a track formed therein, a tool tray secured to an upper surface of the support base, and an adjustable clamping mechanism secured to the support base for clamping the device to a vehicle tire or other convenient support structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tire mounted work tray apparatus and method which has many of the advantages of the tool trays and supports for tool trays mentioned heretofore and many novel features that result in a new tire mounted work tray which is not anticipated, rendered obvious, suggested, or even implied by any of the prior art tool trays and supports for tool trays, either alone or in any combination thereof.

It is another object of the present invention to provide a new tire mounted work tray that may be easily and efficiently manufactured and marketed.

It is a further object of the present invention to provide a new tire mounted work tray that is of a durable and reliable construction.

An even further object of the present invention is to provide a new tire mounted work tray which is susceptible of a low cost of manufacture with regard to both materials and labor, and which accordingly is then susceptible of low prices of sale to the consuming public, thereby making such tire mounted work tray economically available to the buying public.

Still yet another object of the present invention is to provide a new tire mounted work tray which provides in the apparatuses and methods of the prior art some of the advantages thereof, while simultaneously overcoming some of the disadvantages normally associated therewith.

Still another object of the present invention is to provide a new tire mounted work tray for providing convenient and easy access to tools while working on vehicles.

Yet another object of the present invention is to provide a new tire mounted work tray which includes an elongated support base with a track formed therein, a tool tray secured to an upper surface of the support base, and an adjustable clamping mechanism secured to the support base for clamping the device to a vehicle tire or other convenient support structure.

Still yet another object of the present invention is to provide a new tire mounted work tray that eliminates the need to leave tools and parts laying around the work area, thus preventing dropped, misplaced, and lost tools and parts.

Even still another object of the present invention is to provide a new tire mounted work tray that secures onto a variety of tires having different sizes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
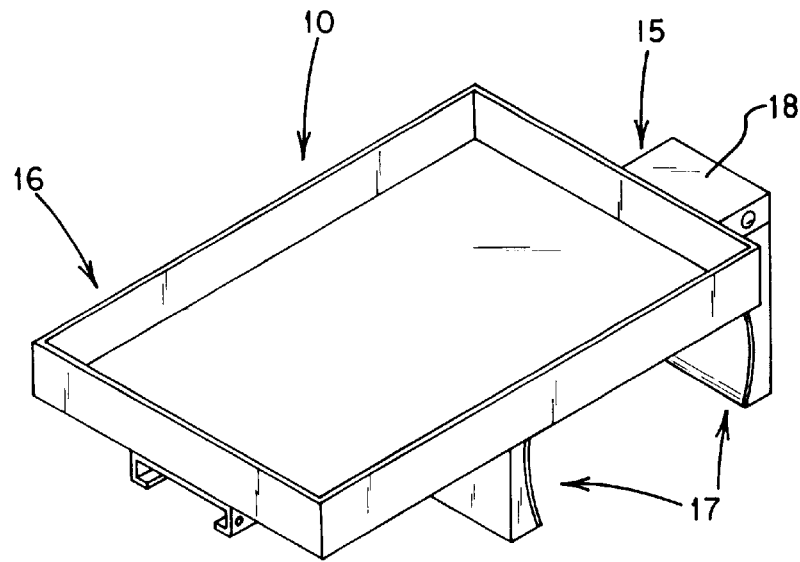
FIG. 1 is an elevated perspective view of a new tire mounted work tray according to the present invention.

With reference now to the drawings, and in particular to FIGS. 1 through 6 thereof, a new tire mounted work tray embodying the principles and concepts of the present invention and generally designated by the reference numeral 10 will be described.

More specifically, it will be noted that the tire mounted work tray/tool holder assembly 10 comprises a support base 15, a tool tray 16, and a clamping mechanism 17 for attaching the assembly to a tire 12 of a vehicle, such as a bus tire, truck tire, car tire, and the like. Although the assembly is shown and described as being attached to a tire, the assembly could be utilized in areas other than vehicles and could be attached to other supporting structures, such as on pipes.

As best illustrated in FIGS. 1 through 6, it can be shown that the support base 15 is a generally elongated bar having an upper wall 18 and side walls 19,20 with inwardly turned ends 21,22, so as to define a generally "C" shaped channel. The ends 21,22 define a track for permitting sliding movements of a carriage thereon, to be later described.

Secured to the top surface of the upper wall 18 is the tool tray 16. The tray 16 is generally rectangular and includes a bottom wall 23 and a plurality of side walls 24 extending upward at right angles from the bottom wall 23 to define an enclosure for holding tools and parts. The tray 16 may be affixed to the upper wall 18 by any conventional means, such as by welds 25. The tray 16 could also be removably affixed to the wall 18 so as to permit removal of the tray from the assembly. If desired, the interior of the tray could be subdivided into a plurality of compartments for better organizing the tools and parts therewithin.

The clamping mechanism 17 is secured to the support base 15 so that it is located on the opposite side of the base from the tray 16. The clamping mechanism includes a stationary clamping portion 26 and a moveable clamping portion 27.

Figure 2:
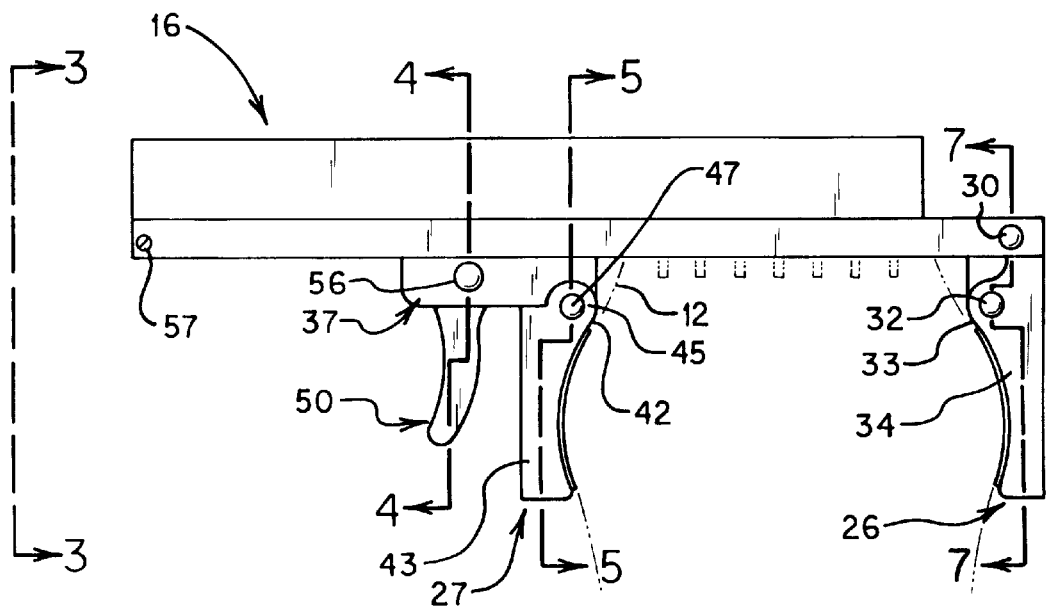
FIG. 2 is a side view of the present invention.
Figure 3:
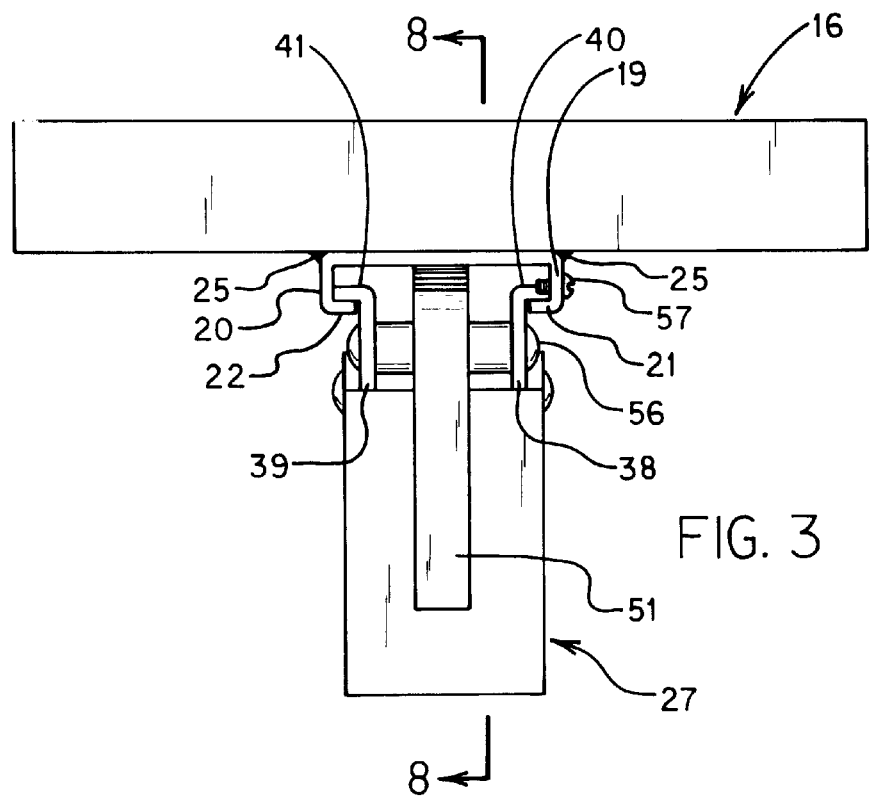
FIG. 3 is a view taken along line 3—3 of FIG. 2.
Figure 4:
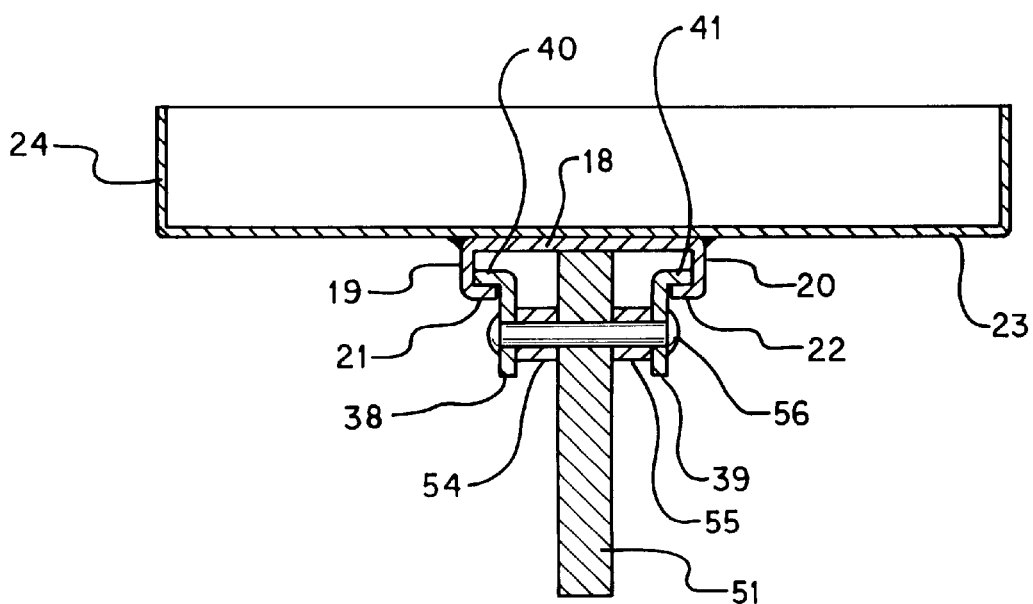
FIG. 4 is a cross sectional view taken along line 4—4 of FIG. 2.
Figure 7:
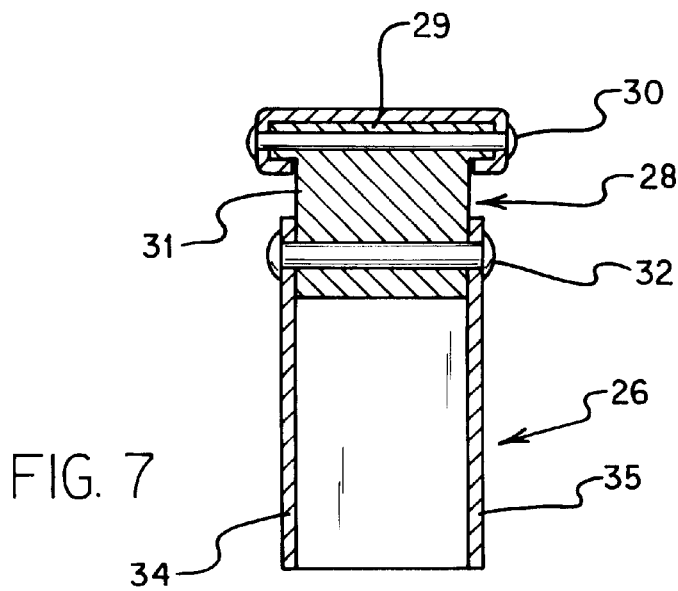
FIG. 7 is a cross sectional view taken along line 7—7 of FIG. 2.
Figure 9:
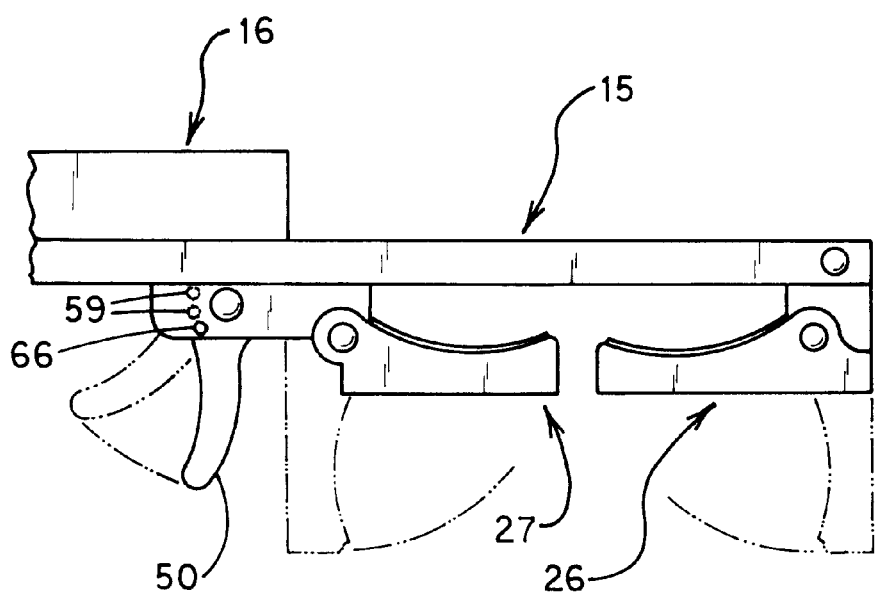
FIG. 9 is a side view of the device with the clamping portions and locking lever pivoted to a non-use position.

Referring to FIGS. 2 and 7, it can be seen that the stationary clamping portion 26 is attached to the support base 15 by a support member 28. The support member 28 includes a head portion 29 snugly received within the "C" shaped channel of the base 15. Rivet 30 extends through each side wall 19,20 and head portion 29 to securely fasten the member 28. Solid base portion 31 extends downward from the head portion 29 where it is attached to the clamping portion 26 by rivet 32. The clamping portion 26 itself includes an arcuate wall 33 with a pair of side walls 34,35 extending therefrom to define a "C" shaped channel. The base portion 31 fits between the side walls 34,35 and the rivet 32 extends through the walls 34,35 and the portion 31 in a manner which permits the clamping portion 26 to pivot about the rivet 32 between the use position (FIG. 2) and the non-use position (FIG. 9). The wall 33 has an arcuate configuration to accommodate the generally arcuate shape of one side wall of the tire 12, illustrated in dashed lines in FIG. 2. The wall 33 includes a layer of rubber gripping material 36 adhered thereto in order to increase the contact between the wall 33 and the tire wall. The material 36 would also prevent marring of the tire or other surface that the clamp is secured to.

Figure 5:
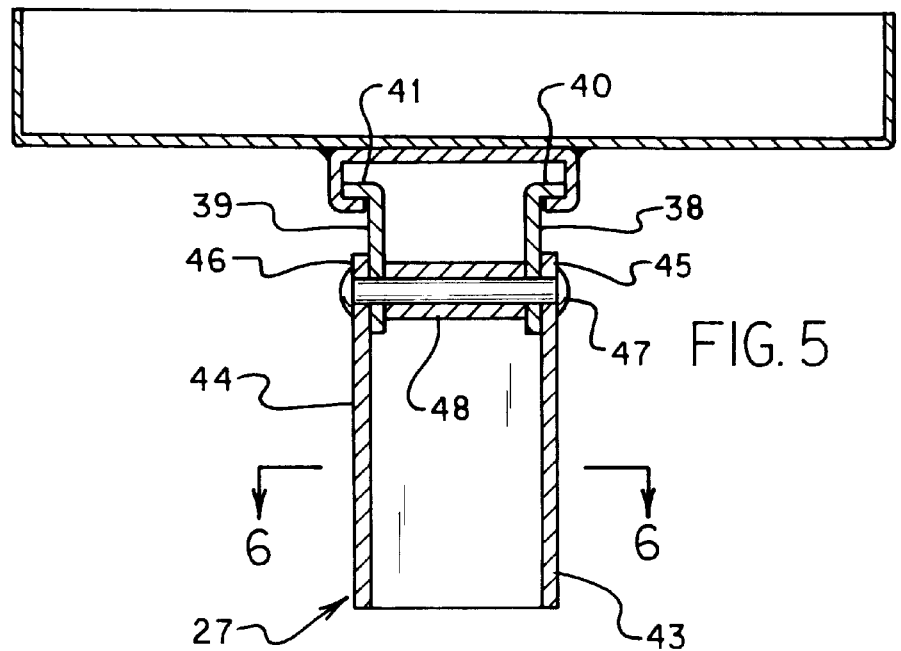
FIG. 5 is a cross sectional view taken along line 5—5 of FIG. 2.
Figure 6:
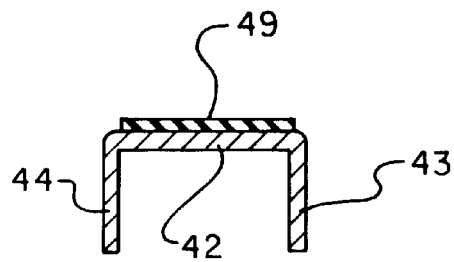
FIG. 6 is a cross sectional view taken along line 6—6 of FIG. 5.

The moveable clamping portion 27 is secured to a carriage 37 that is affixed within the "C" shaped channel of the base 15. As illustrated in FIG. 5, the carriage 37 includes a pair of walls 38,39 having outwardly turned ends 40,41 which are slidably disposed upon the ends 21,22. Thus the ends 21,22,40,41 permit the carriage to be slid along the "C" shaped channel of the base. The moveable clamping portion 27 includes an arcuate clamping wall 42 similar to the wall 33 of stationary clamping portion 26, and side walls 43,44 extending from the wall 42. Each side wall 43,44 further includes an upwardly extending ear 45,46 that are disposed on the outer side of the walls 38,39. Rivet 47 extends through the ears 45,46 and walls 38,39, and through a spacer 48 disposed between the walls 38,39, in a manner which permits the moveable clamping portion 27 to be pivoted between a use position (FIG. 2) and a non-use position (FIG. 9). Similar to wall 33, the wall 42 includes a rubber gripping material 49, as is best illustrated in FIG. 6.

Thus it can easily be seen that by sliding the carriage 37 and attached moveable clamping portion 27 along the "C" shaped channel of the base 15, the clamping mechanism 17 can be adjusted to fit different tire widths. The clamping portion 27 is adjusted until both the clamping surfaces 33,42 and their rubber gripping materials firmly contact opposite sides of the tire 12, with the base 15 disposed along the top of the tire, as can be seen in FIG. 2. The moveable clamping portion and carriage must be fixed in position once both of the clamping portions are positioned correctly, and thus a locking means 50 is provided.

As illustrated in FIGS. 2, 3, 4, and 8, the locking means 50 comprises a locking lever 51 pivotally attached to the carriage 37. The locking lever 51 includes a rounded, enlarged head portion 52 provided with teeth 53 along an upper surface thereof and an aperture 58 therein. The locking lever is disposed between the walls 38,39 of the carriage and spacers 54,55 are disposed between the lever and the walls. Walls 38, 39 also include holes 59 such that a pin 66 is insertable through the walls and the enlarged head portion of the locking lever to lock it in place. A rivet 56 extends through the walls, spacers, and rounded head portion of the lever in a manner that attaches the lever to the carriage, but permits the lever to be pivoted relative thereto.

Figure 8:
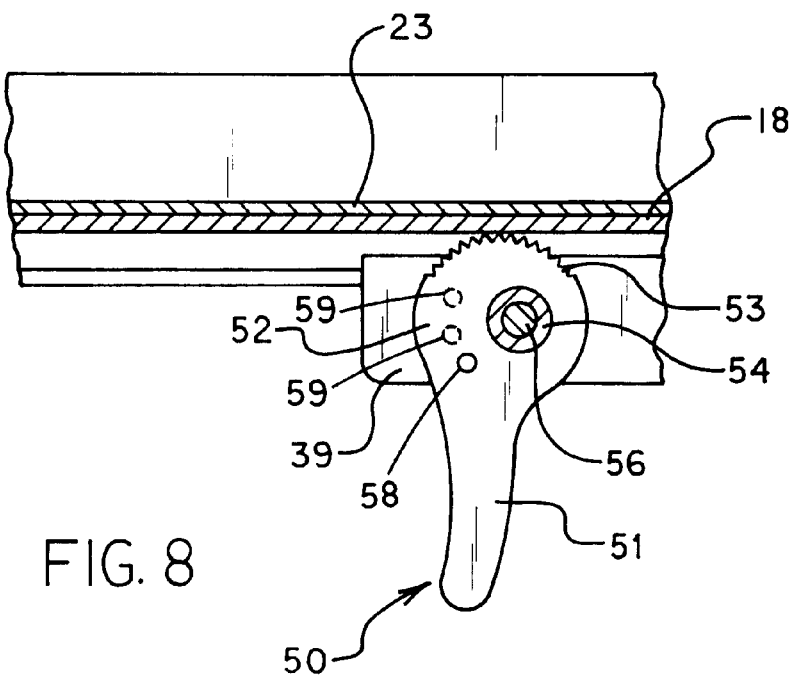
FIG. 8 is a partial cross sectional view taken along line 8—8 of FIG. 3.

As best illustrated in FIG. 8, the rivet 56 does not extend through the center of the rounded head portion 52. Therefore, when the lever 51 is rotated clockwise in FIG. 8 about the rivet 56, the teeth 53 contact the bottom of the wall 18 to frictionally prevent sliding movement of the carriage and moveable clamp portion. However, when the lever 51 is rotated counterclockwise in FIG. 8, the teeth 53 gradually disengage from contact with the wall 18, thus permitting movement of the carriage and clamping portion.

The base 15 includes a stop in the form of a screw 57 which extends through a threaded hole (not shown) formed in the side wall 19 adjacent the end of the "C" shaped channel. As is evident from FIG. 3, the screw 57 contacts the end portion 40 of the carriage, preventing movement of the carriage beyond the screw so that the carriage cannot be accidentally slid out of the channel. The screw 57 must first be removed from the side wall 19 in order to remove the carriage from the channel.

In use, with all the parts assembled, the locking lever is pivoted counterclockwise to disengage the teeth 53 from the wall 18. The clamping portions, which are in the use position, are placed on opposite sides of the tire. The carriage is then slid along the channel, thus moving the moveable clamping portion, until the tire is firmly clamped between the portions. The lever is then pivoted clockwise so that the teeth engage the wall, thus frictionally preventing further sliding movement of the carriage. The user thus has easy access to tools and parts that are placed within the tray, which is stably supported upon the tire. When the device is not in use, the clamping portions and locking lever can be pivoted as shown in FIG. 9 to facilitate storage and packaging requirements.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool holder assembly, comprising:

an elongated support base including a track formed therein;

a tool tray secured to an upper surface of the support base;

adjustable clamp means secured to the support base adapted for clamping the assembly to a support surface, said adjustable clamp means comprising a stationary clamp portion pivotally attached to the support base and a moveable clamp portion pivotally attached to a carriage slidably disposed within the track; and a locking lever pivotally attached to the carriage, the locking lever having an arcuate outer perimeter being selectively extendable above the carriage by pivoting said locking lever whereby the carriage is urged against the track when said locking lever is pivoted for frictionally preventing movement of the carriage, the locking lever being disposed between opposing walls of the carriage, the opposing walls each including a plurality of aligned holes, the locking lever including an aperture extending transverse to a plane in which the locking lever pivots, the aperture being alignable with a selectable pair of opposing holes in the walls of the carriage such that a pin is insertable through the walls and the locking lever for preventing the locking lever from pivoting whereby the outer perimeter of the locking lever is securable in an extended position for preventing movement of the carriage.

2. The tool holder assembly of claim 1, further comprising a stop means affixed to the support base for limiting the range of sliding movement of the carriage within the track.

3. The tool holder assembly of claim 1, wherein the outer perimeter of the locking lever has a toothed portion for facilitating prevention of lateral movement of the locking lever with respect to the tray when the outer perimeter is in the extended position.

4. The tool holder assembly of claim 1 wherein the support surface is a vehicle tire, and wherein each clamp portion includes an arcuate clamping wall adapted for engaging the vehicle tire.

5. The tool holder assembly of claim 4, wherein each arcuate clamping wall is covered by a rubber gripping material for facilitating secure engagement of the clamp means to the vehicle tire.

6. A tool holder assembly, comprising:

an elongated support base including a track formed therein;

a tool tray secured to an upper surface of the support base;

adjustable clamp means secured to the support base adapted for clamping the assembly to a support surface, said adjustable clamp means comprising a stationary clamp portion pivotally attached to the support base and a moveable clamp portion pivotally attached to a carriage slidably disposed within the track;

a locking lever pivotally attached to the carriage, the locking lever having an arcuate outer perimeter being selectively extendable above the carriage by pivoting said locking lever whereby the carriage is urged against the track when said locking lever is pivoted for frictionally preventing movement of the carriage, the locking lever being disposed between opposing walls of the carriage, the opposing walls each including a plurality of aligned holes, the locking lever including an aperture extending transverse to a plane in which the locking lever pivots, the aperture being alignable with a selectable pair of opposing holes in the walls of the carriage such that a pin is insertable through the walls and the locking lever for preventing the locking lever from pivoting whereby the outer perimeter of the locking lever is securable in an extended position for preventing movement of the carriage;

a stop means affixed to the support base for limiting the range of sliding movement of the carriage within the track;

the outer perimeter of the locking lever having a toothed portion for facilitating prevention of lateral movement of the locking lever with respect to the tray when the outer perimeter is in the extended position;

wherein each clamp portion includes an arcuate clamping wall adapted for engaging the vehicle tire; and each arcuate clamping wall being covered by a rubber gripping material for facilitating secure engagement of the clamp means to the vehicle tire.

* * * * *